United States Patent [19]

Albright

[11] Patent Number: 4,941,971

[45] Date of Patent: Jul. 17, 1990

[54] APPARATUS FOR MOUNTING IN AN AQUEOUS SYSTEM, A CARTRIDGE FILTER FOR FILTERING THE SYSTEM AND IN PLACE CLEANING THE FILTER

[76] Inventor: Alva Z. Albright, 1927 Albert St., Alexandria, La. 71301

[21] Appl. No.: 803,291

[22] Filed: Dec. 2, 1985

Related U.S. Application Data

[63] Continuation-in-part of Ser. No. 764,544, Aug 12, 1985, abandoned.

[51] Int. Cl.⁵ .............................................. B01D 33/06
[52] U.S. Cl. .................................... 210/107; 210/354; 210/357; 210/395; 210/409; 210/422; 134/168 R; 134/169 A
[58] Field of Search ............... 210/106, 107, 190, 205, 210/249, 250, 357, 407, 409, 410, 414, 420, 422, 435, 455, 456, 457, 402, 390, 391, 392, 395, 354; 134/166 R, 167 R, 168 R, 169 R, 169 A, 172, 199

[56] References Cited

U.S. PATENT DOCUMENTS

| | | | |
|---|---|---|---|
| 3,025,213 | 3/1962 | Copeland | 210/402 |
| 3,190,452 | 6/1965 | Martin | 210/391 |
| 3,338,416 | 8/1967 | Barry | 210/354 |
| 3,532,220 | 10/1970 | Lewis | 210/409 |
| 3,647,071 | 3/1972 | Lamort | 210/107 |
| 3,795,319 | 3/1974 | Luthi et al. | 210/409 |
| 3,957,639 | 5/1976 | Schoen et al. | 210/107 |
| 4,287,063 | 9/1981 | Stenzel | 210/407 |
| 4,615,801 | 10/1986 | Lee | 210/391 |
| 4,808,234 | 2/1989 | McKay et al. | 210/354 |

*Primary Examiner*—W. Gary Jones
*Assistant Examiner*—Wanda L. Millard
*Attorney, Agent, or Firm*—Pravel, Gambrell, Hewitt, Kimball & Krieger

[57] ABSTRACT

A horizontally mounted cylindrical container is adapted to mount through demountable end plates a cartridge filter in the container through demountable end plates for rotation around a lower axis than the center axis of the container. The combination of container and filter is connected in an aqueous system through a top inlet pipe and hand controlled valve and a lower front end plate outlet, and to a source of pressure cleaning media through an upper quadrant valve controlled turnable tube slidably mounted through a rear plate inlet and supported in the container by a combination track and baffle member fixed to the container top. A nozzle fixed to the free end of the pressure media tube jets cleaning media against the filter to rotate it alternately in both directions of rotation and for its full length. A second inlet pipe and valve is fixed to the top inlet pipe a chemical cleaning soak in baffled minimum amounts because of the baffling and filter mounting below the center of the container. A bottom outlet pipe and valve provides a drain for removal of pressure media and chemical soak soil.

11 Claims, 2 Drawing Sheets

APPARATUS FOR MOUNTING IN AN AQUEOUS SYSTEM, A CARTRIDGE FILTER FOR FILTERING THE SYSTEM AND IN PLACE CLEANING THE FILTER

This is a continuation-in-part of application Ser. No. 06/764,544, filed Aug. 12, 1985, and now abandoned.

BACKGROUND OF THE INVENTION

The invention relates generally to cleaning cartridge filters soiled in use in large aqueous systems such as swimming pools and spas, and more particularly to apparatus for and a method of mounting in an aqueous system a cartridge filter for filtering the system and in place cleaning the filter.

The applicant knows of no prior art in this field applicable to the invention. Filter cartridges for large aqueous systems are generally too big, heavy, wet and soiled for easy removal from a system for periodic cleaning.

SUMMARY OF THE INVENTION

The invention teaches a cylindrical container having end bearings for mounting therein a cartridge filter for rotation on an axis below the container's center axis, and a pressure cleaning-medium pipe and end nozzle slidably mounted above the filter. Three inlets and two outlets are defined into and out of the container with manually operable hand valves for controllably connecting the aqueous system into the container and around and out of the filter and container, and alternatively, to a pressurized source of cleaning fluid or medium and/or to a source of a chemical cleaning soak and to one of the two container outlets, a drain, defined therein. When cleaning is desired, access to and from the aqueous system to the container and filter is cut-off and the filter is cleaned by soaking in a chemical bath admitted into the container and baffled around the filter to a convenient depth, and/or centrifugally cleaned by jetting pressure cleaning medium through the pressure pipe and a nozzle directed from above at various angles to either side of the filter's axis of rotation for filter rotation in opposite directions with filter pipe and nozzle slidable for the filter length. Filter soil is flushed out of the container through the container outlet drain, and the container reconnected in the aqueous system through the manually controlled valves. Periodic cleaning procedures are followed for the life of the filter, then a new filter is mounted in the container end bearings and the cleaning process continued.

It is an object of the invention to provide in place cleaning of all operational cartridge filters in an aqueous system, such as a swimming pool or a spa.

Another object of the invention is to provide that there be no mixing of aquous system fluid and cleaning solutions during either the filtering or the cleaning operations.

Yet another object of the invention is to provide filter centrifugal cleaning and/or a chemical solution soak cleaning in operational place.

And a final object is to provide a lower axis of rotation for the filter than the center axis of the container for minimizing the amount of chemical soak necessary for use in cleaning.

DETAILED DESCRIPTION OF THE PREFERRED EMBODIMENTS

Figure 1:
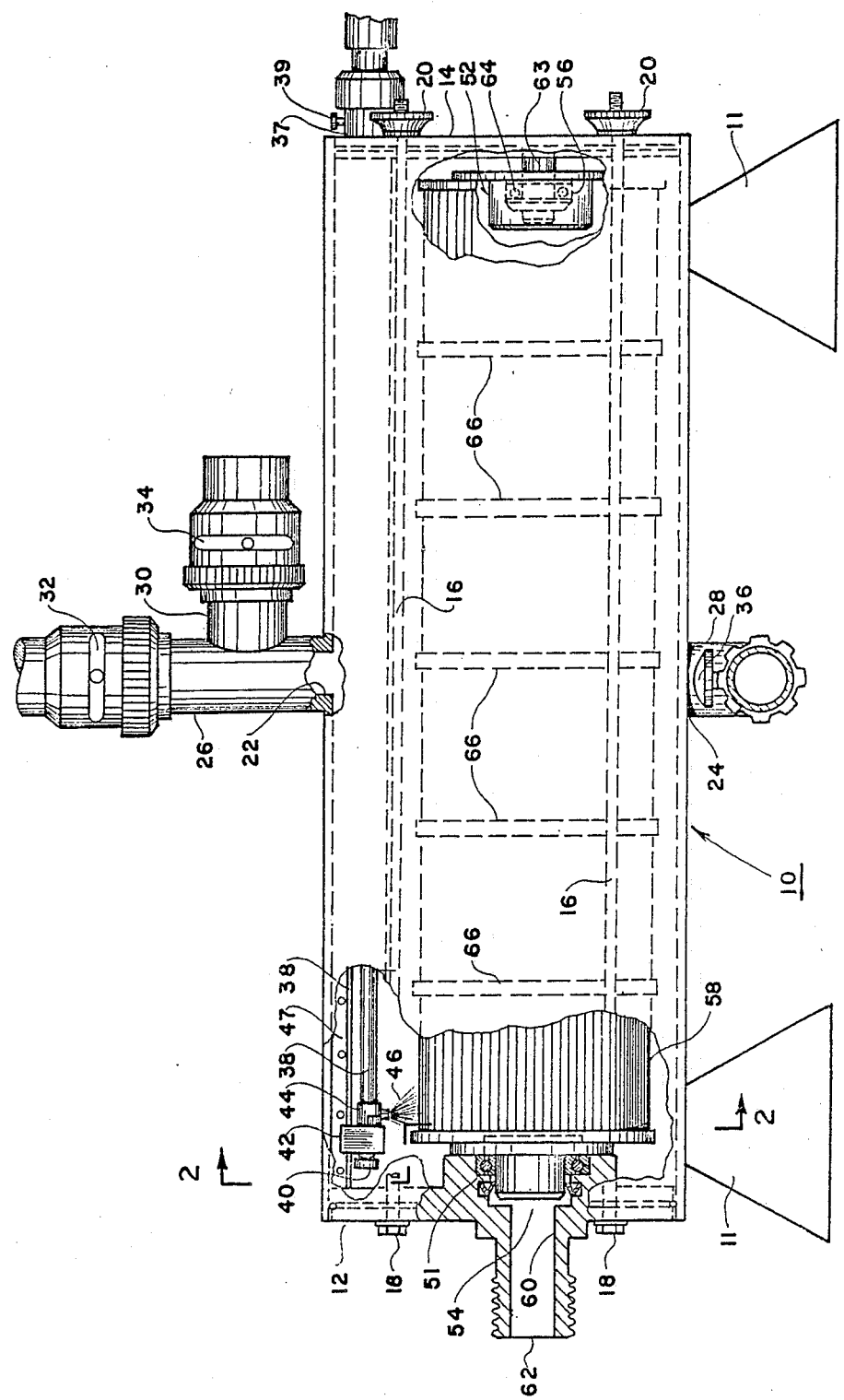
FIG. 1 is a partially cut-away side elevation of the cylindrical container with inlets and outlets thereto and pressure medium pipe and nozzle therefor, and a cartridge filter mounted for rotation in the container.
Figure 2:
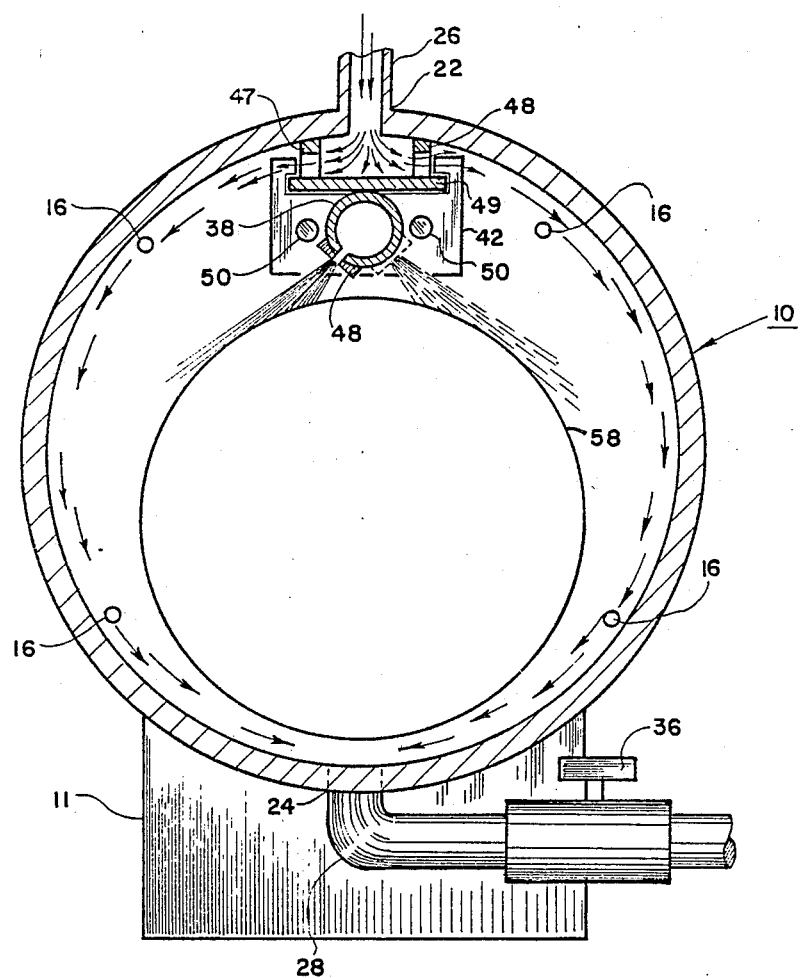
FIG. 2 is a cross sectional view taken along section lines 2—2 of FIG. 1.
Figure 3:
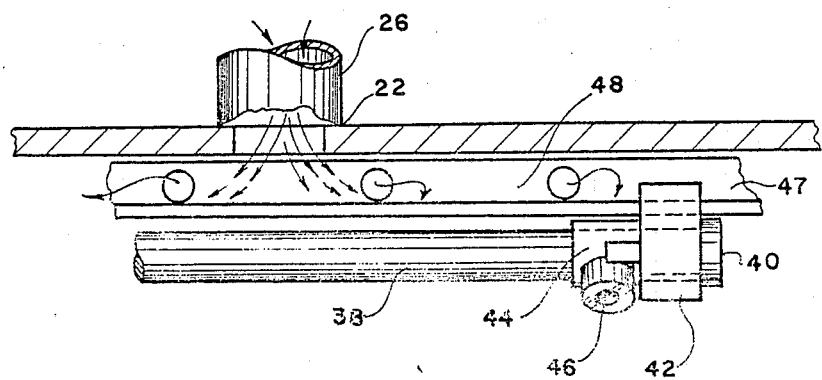
FIG. 3 is a partial side elevation of the nozzle end of the pressure medium pipe slidably mounted on combination slide and baffle adjacent inlet for aqueous system fluid and chemical soak solution.

Referring to FIGS. 1-3, the invention comprises a cylindrical container 10, supported on two stands 11 positioned adjacent respective oppositely disposed container ends closed by end plates 12 and 14 held in place by four longitudinal rods 16 equally spaced angularly therearound and secured by front nuts 18 and rear hand nuts 20. Intermediate the closed ends are an upper inlet 22 and a lower outlet 24 in which are vertically mounted respective vertical pipes 26 and 28, pipe 26 having an additional horizontal branch 30, both vertical and horizontal branches being fitted with manually operable valves 32 and 34 respectively, and pipe 28 being angled upwardly ninety degrees and fitted with a similar valve 36. Rear plate 14 defines an upper quadrant inlet 37 through which is mounted turnably a cleaning media pressure inlet tube 38 that extends longitudinally through the container to front plate 12, the tube end being closed by a cap 40. A slidable member 42 is turnably mounted on inlet tube 38 and held in place thereon between end cap 40 and a nozzle block 44 fixed on tube 38. A nozzle orifice and channel 46 connects the lower end of nozzle block 44 with the interior of media tube 38. A track and baffle member 47 is an open topped conduit with perforated sides 48 and a closed bottom, normal to said sides, having oppositely disposed ends extending beyond said sides to define slide tracks 49, and is fixed by said perforated sides' free edges to the interior top of container 10, enclosing upper inlet 22 between said perforated sides 48. Slidable member 42 is adapted to slidably engage slide tracks 49 for support for itself and the end of media tube for the length of the container, and additionally it provides stops 50 for limiting nozzle block transverse swing and media tube's rotation. Cap 40 and nozzle block 44 provide for and aft stops in cooperation with respective end plates 12 and 14 to limit longitudinal movement of the media tube.

Front plate 12 houses roller bearing 51 with a center axis below container 10 centerline for engaging a free end 54 of a hollow shaft center-fixed in the front end of cartridge filter 58 for support and rotation therewith, said plate also defining container outlet 62. Rear plate 14 mounts an interiorly extending stub shaft 63 alinged with the center axis of front bearing 51 for engaging a rear bearing 64 center mounted in the rear end of filter 58 for rotation around the said filter's common axis of rotation established by the front plate bearing 51, the rear plate shaft 63, and the center-mounted shaft's front end 54 and rear bearing 64 of cartridge filter 51. In addition to the end beaing and shaft, the cartridge filter is peripherally banded by a plurality of bands 66 longitudinally spaced for preventing loss of filter material at high rotational speeds. Front bearing 51 is sealed against any leakage therethrough from the container to the aqueous system by a Parker "U" seal, manufactured by Parker & Annefin, Salt Lake City, Utah.

In use the apparatus of the invention is connected in an aqueous system by means of horizontal branch 30 of inlet 22 and valve 34 opened. Upper inlet pipe 26 valve 32 and the lower outlet pipe 28 valve 36 are closed. A pressure source of cleaning media (not shown) is connected to the exterior inlet end of media tube 38 through a hand valve 39 which is closed. Water or filtrate from the aqueous system enters through valve 34 and into the container branch 30 inlet 22, is baffled by track and baffle member 47 perforated sides 48 and passes around the then through filter 58 and out of the container through hollow shaft end 54 and front plate outlet 62 of container 10. Periodically the filter is cleaned by closing inlet valve 34 and opening outlet valve 36 of container 10, and inlet valve 39 of the pressure medium tube 38. The cleaning media is jetted out of nozzle 46 that is swung angularly to one of the side stops 50 to strike the filter off its center of rotation and rapidly rotate it while sliding the media tube for the length of the container and back, then swinging the nozzle to the other side stop and repeating the longitudinal sliding. The soiled pressure media falls to the bottom of the container and passes out by pipe 28 through outlet 24 and open valve 36. In case of heavy soil, a cleaning chemical can be introduced into the container through valve 32 of upper inlet 22, with lower valve 36 closed; to any desired depth in the container. Since the center of rotation of the filter is below the centerline of the container, and the filter is rotatable, a minimum amount of cleaning chemical is required for the soak or bath. When the cleaning is completed, the hand valves are returned to the positions described for filtering. At the end of the filter's life, it is replaceable through the rear plate by unscrewing hand nuts 20, removing rear plate 14, inserting a new filter and front hollow shaft to engage front plate bearing 51, engaging rear plate shaft in the bearing mounted in the filter's rear end, and securing the rear plate to the container by means of rods 16 and hand nuts 20. The container is pressurized by the aqueous system pumps (not shown) and the system drained thru pipe 28 by opening valve 36.

What is claimed is:

1. Filtering apparatus comprising:
   (a) a container;
   (b) a filter cartridge mounted in the container;
   (c) means for allowing the filter cartridge to rotate relative to the container;
   (d) means for causing the filter cartridge to rotate relative to the container, consisting essentially of a nozzle for directing pressurized fluid against the outside of the filter cartridge;
   (e) first inlet means communicating with the interior of the container exterior of the filter cartridge for allowing fluid to enter the container exterior of the filter cartridge; and
   (f) first outlet means communicating with the interior of the filter cartridge for allowing fluid to exit the container from the interior of the filter cartridge.

2. The apparatus of claim 1, wherein the container has a length and the means for causing the filter cartridge to rotate relative to the container further comprises means for moving the nozzle back and forth substantially along the length of the container.

3. The apparatus of claim 1, further comprising:
   second outlet means for allowing fluid to exit the container from exterior of the filter cartridge.

4. The apparatus of claim 3, further comprising:
   valve means for controlling flow of fluid through the second outlet means and for controlling flow of fluid through the first inlet means.

5. The apparatus of claim 1, further comprising:
   means for removing the filter cartridge from the container.

6. The apparatus of claim 1, wherein the means for allowing the filter cartridge to rotate relative to the container comprises bearings.

7. The apparatus of claim 1, wherein:
   the container has a central longitudinal axis;
   the filter cartridge has a central longitudinal axis; and
   when the apparatus is in an operational position, the central longitudinal axis of the filter cartridge is disposed below the central longitudinal axis of the container.

8. Filtering apparatus comprising:
   (a) a container;
   (b) a filter cartridge mounted in the container;
   (c) means for allowing the filter cartridge to rotate relative to the container;
   (d) means for causing the filter cartridge to rotate fast enough to remove contaminants therefrom by centrifugal force, consisting essentially of a nozzle for directing pressurized fluid against the outside of the filter cartridge;
   (e) first inlet means communicating with the interior of the container exterior of the filter cartridge for allowing fluid to enter the container exterior of the filter cartridge;
   (f) first outlet means communicating with the interior of the filte cartridge for allowing fluid to exit the container from the interior of the filter cartridge; and
   (g) second outlet means for allowing fluid to exit the container from exterior of the filter cartridge.

9. The apparatus of claim 8, further comprising means for removing the filter cartridge from the container, and wherein the container has a length, the means for causing the filter cartridge to rotate fast enough to remove contaminants therefrom by centrifugal force comprises means for moving the nozzle back and forth substantially along the length of the container.

10. The apparatus of claim 8, further comprising:
    valve means for controlling flow of fluid through the second outlet means and for controlling flow of fluid through the first inlet means.

11. The apparatus of claim 8, wherein:
    the container has a central longitudinal axis;
    the filter cartridge has a central longitudinal axis; and
    when the apparatus is in an operational position, the central longitudinal axis of the filter cartridge is disposed below the central longitudinal axis of the container.

* * * * *